United States Patent [19]

Dischert

[11] 4,415,931
[45] Nov. 15, 1983

[54] TELEVISION DISPLAY WITH DOUBLED HORIZONTAL LINES

[75] Inventor: Robert A. Dischert, Burlington, N.J.

[73] Assignee: RCA Corporation, New York, N.Y.

[21] Appl. No.: 359,612

[22] Filed: Mar. 18, 1982

[51] Int. Cl.³ .............................................. H04N 5/68
[52] U.S. Cl. .................................. 358/242; 358/134; 358/140; 358/152; 358/166
[58] Field of Search .............. 358/140, 134, 152, 166, 358/242

[56] References Cited

U.S. PATENT DOCUMENTS 4,364,090 12/1982 Wendland .......................... 358/140

FOREIGN PATENT DOCUMENTS

2111797 United Kingdom
2090505 7/1982 United Kingdom .
2092858 8/1982 United Kingdom ................ 358/140

*Primary Examiner*—Howard Britton
*Attorney, Agent, or Firm*—Eugene M. Whitacre; William H. Meise

[57] ABSTRACT

A television display reduces the visibility of the raster-scan structure. Each incoming horizontal line of video information is stored in a memory and read twice at a double clock frequency. Each incoming horizontal line is therefore replicated. Each line and its delayed replica are applied to a display device scanned at double the normal rate, thereby displaying each horizontal line of information as a line pair oriented one above the other. This doubles the number of scanning lines in the display in a simple manner and reduces the visibility of the raster scan structure.

7 Claims, 7 Drawing Figures

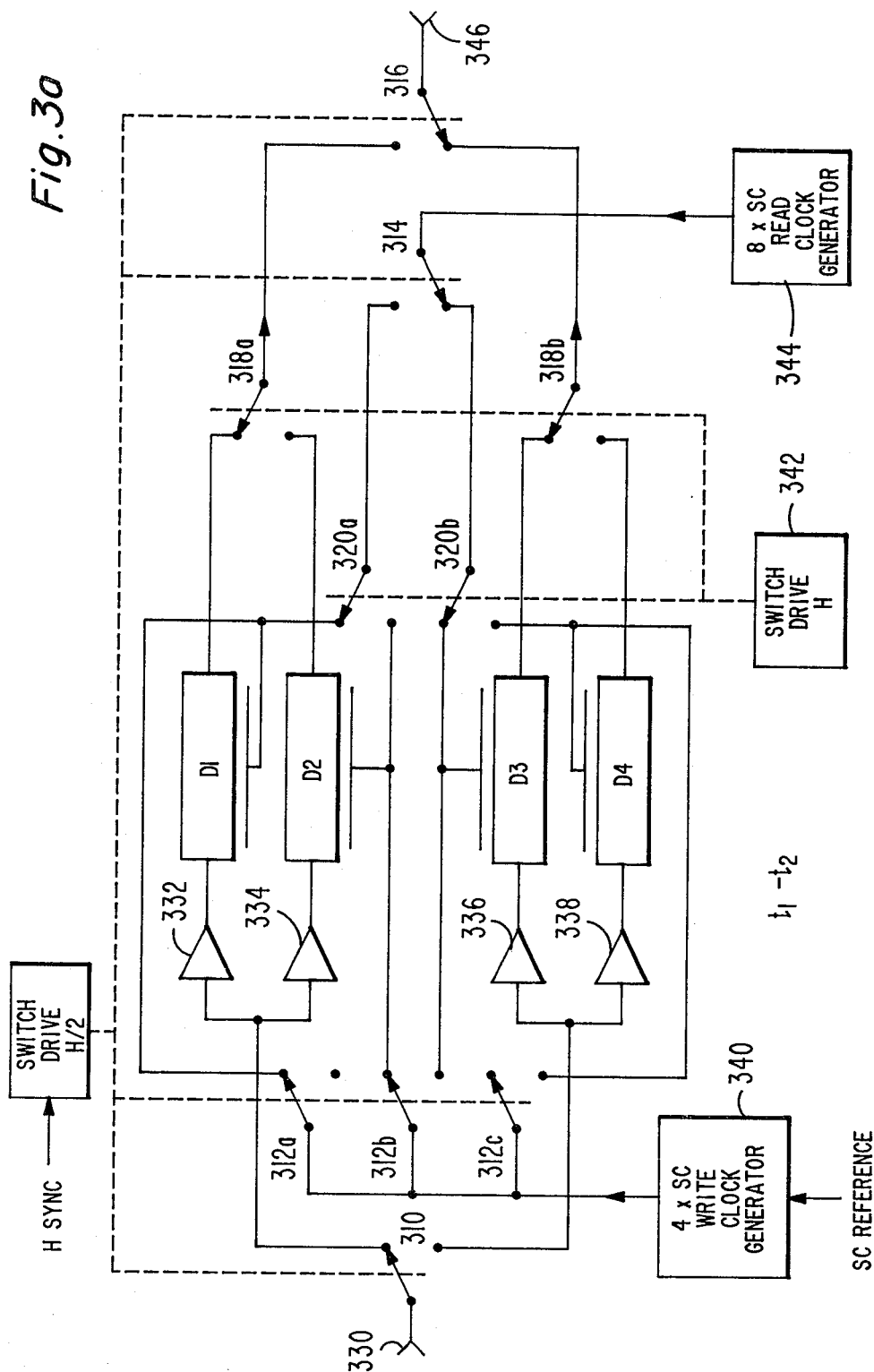

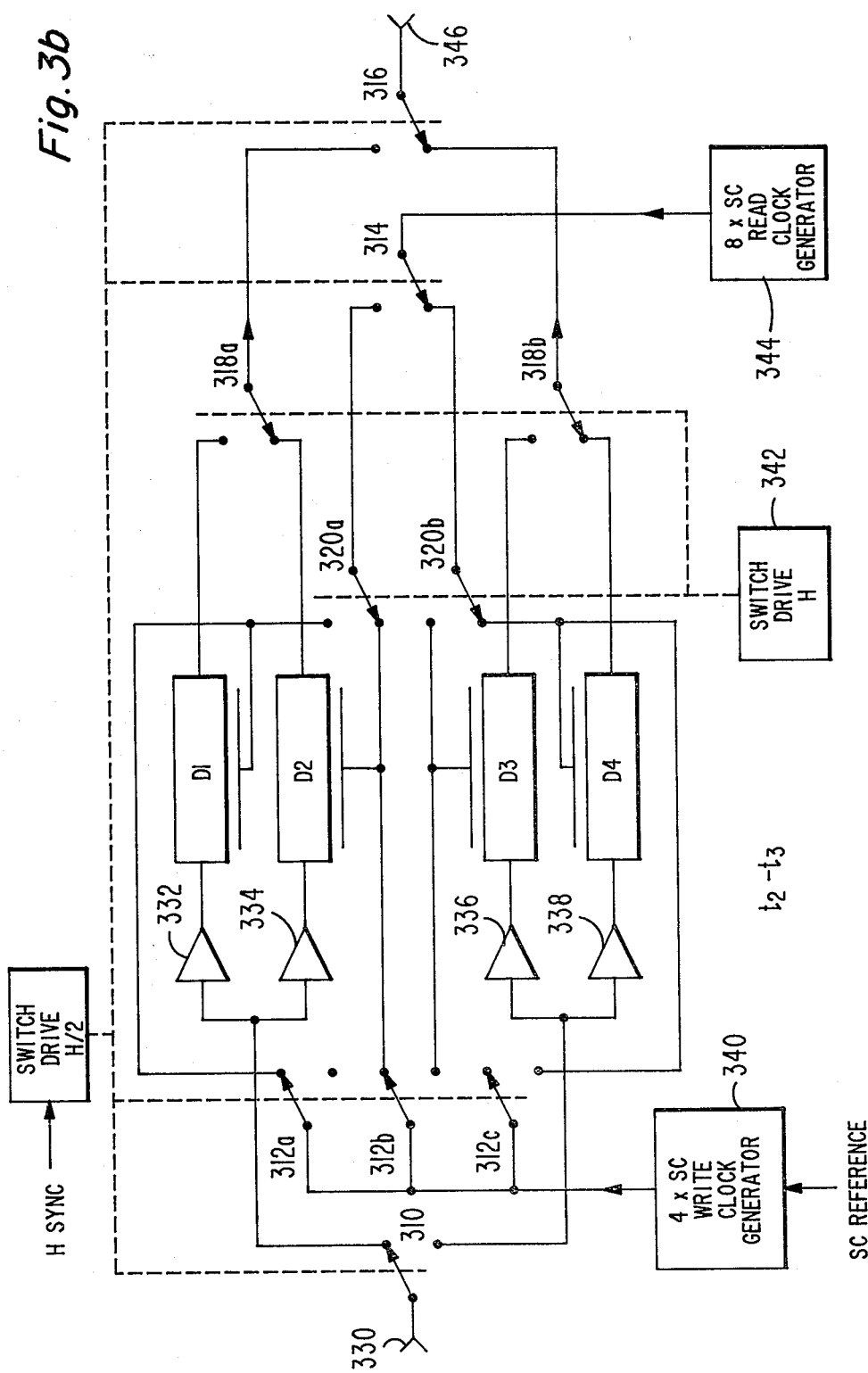

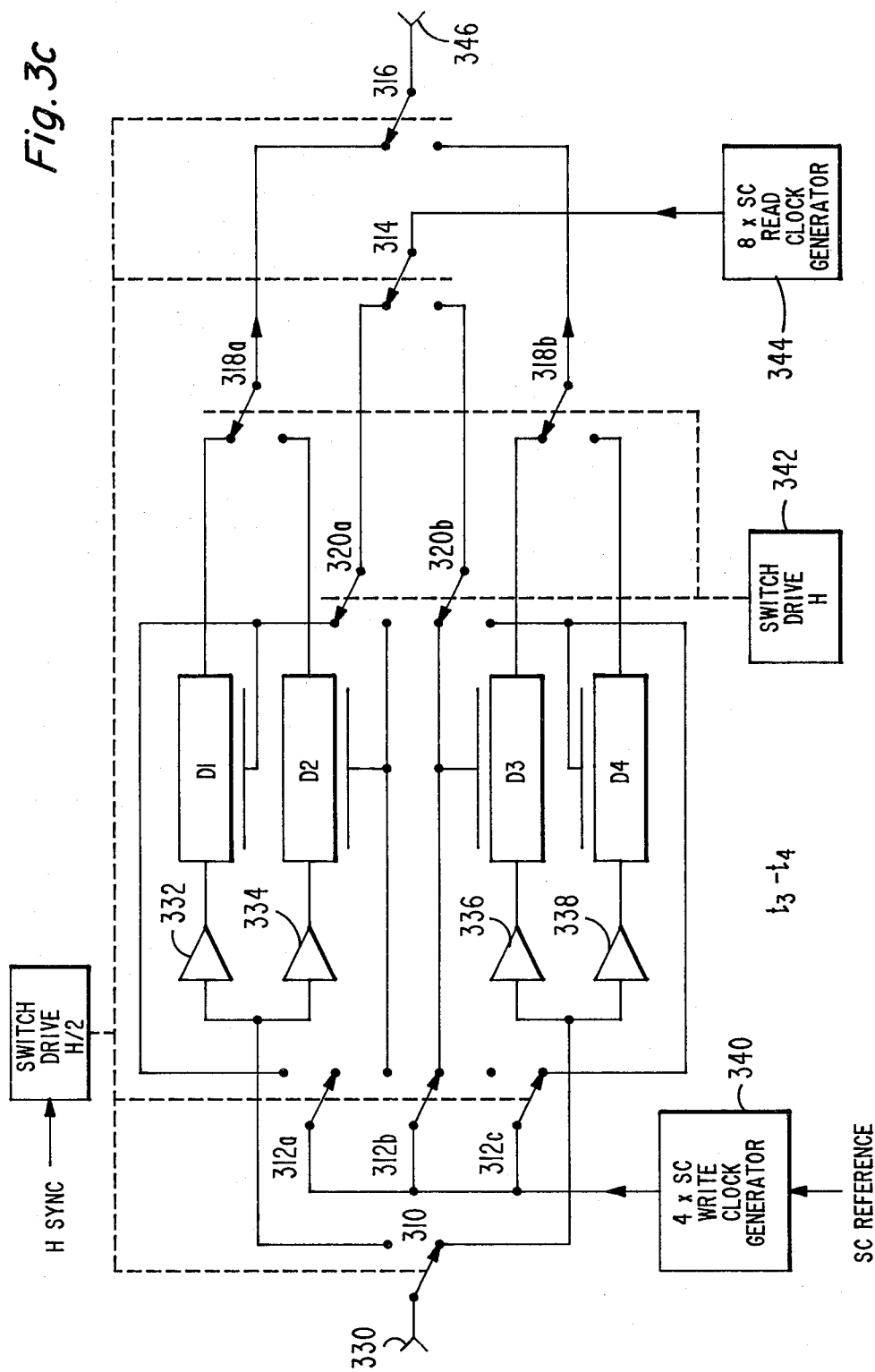

TELEVISION DISPLAY WITH DOUBLED HORIZONTAL LINES

Television monitors or receivers display a line structure in the vertical direction because the signal is sampled a finite number of times. For example, NTSC standards provide for 525-lines-per-frame broken up into 262½ lines per field. The vertical resolution may appear to be less than the horizontal resolution because of the line structure, even though the vertical resolution is higher than the horizontal resolution, as a result of the relatively limited horizontal bandwidth. One way to reduce the visibility of the line structure is to increase the height or vertical dimension of the horizontally-scanning spot. Such an astigmatic spot would fill in the interstices between horizontal lines and conceal the line structure. This may be difficult to accomplish over the entire raster display because of conflicting requirements of horizontal resolution, convergence, coma and the like.

An arrangement for increasing the vertical resolution of the television system in a manner compatible with standard PAL and NTSC systems is described in U.S. Patent Application Ser. No. 288,753 filed 7-31-81 in the names of Oakley and Dischert. The double-rate line-scan signals generated at the source in this system are summed and differenced on a line-by-line basis, and the sum signal is transmitted as the compatible standard-rate line-scan signal, while the difference signal necessary to reconstruct the information of the high-resolution double-line-rate signal is conveyed to the receiver by concealing it in a portion of the color signal. Such a system decreases the visibility of the scan lines, but requires the existence of a transmitter and a receiver, which may require amendments to broadcast standards, and even when implemented, there may not be sufficient software or programs which are derived from high-resolution sources.

It may therefore be desirable to be able to reduce the visibility of the vertical sampling by horizontal line-scans in the receiver itself. An arrangement is described in U.S. Patent Application Ser. No. 300,227 filed 9-8-81 in the name of Kerns H. Powers for decreasing the visibility of the vertical sampling by generating at the receiver an increased number of horizontal lines, and interpolating information for additional lines to produce an approximation of a high-definition display. In the Powers system, 1-H delays are used to generate the delayed signals necessary for interpolation. The interpolation process itself, however, requires the use of multipliers operating at video rate.

It is desirable to reduce the visibility of the line-scan structure at the receiver in a simple manner.

SUMMARY OF THE INVENTION

According to the method described the number of horizontal raster lines is increased, and on a particular embodiment is doubled. For example, in the case of the 485 active lines of a 525-line-per-frame NTSC input signal, the described system displays 1070 lines. The information required to fill the additional lines is achieved by the simple expedient of displaying each horizontal line twice.

DESCRIPTION OF THE DRAWING

FIGS. 3a, 3b, 3c and 3d are a block diagram of a particular form of time compressor which may be used in the arrangements of FIGS. 1 or 2.

DESCRIPTION OF THE INVENTION

A television display system arranged to decrease the visibility of the raster line structure includes a source of line-sequential raster-scanned video signals representative of the image. Each such original line of video information is coupled to and written into a memory. The memory is read two or more times and each line as read is displayed on a television screen the same number of times. The next original line is similarly repeated, to form a display raster in which each horizontal line of video is repeated at least once, thereby reducing the visibility of the line structure by increasing the number of lines displayed.

Figure 1:
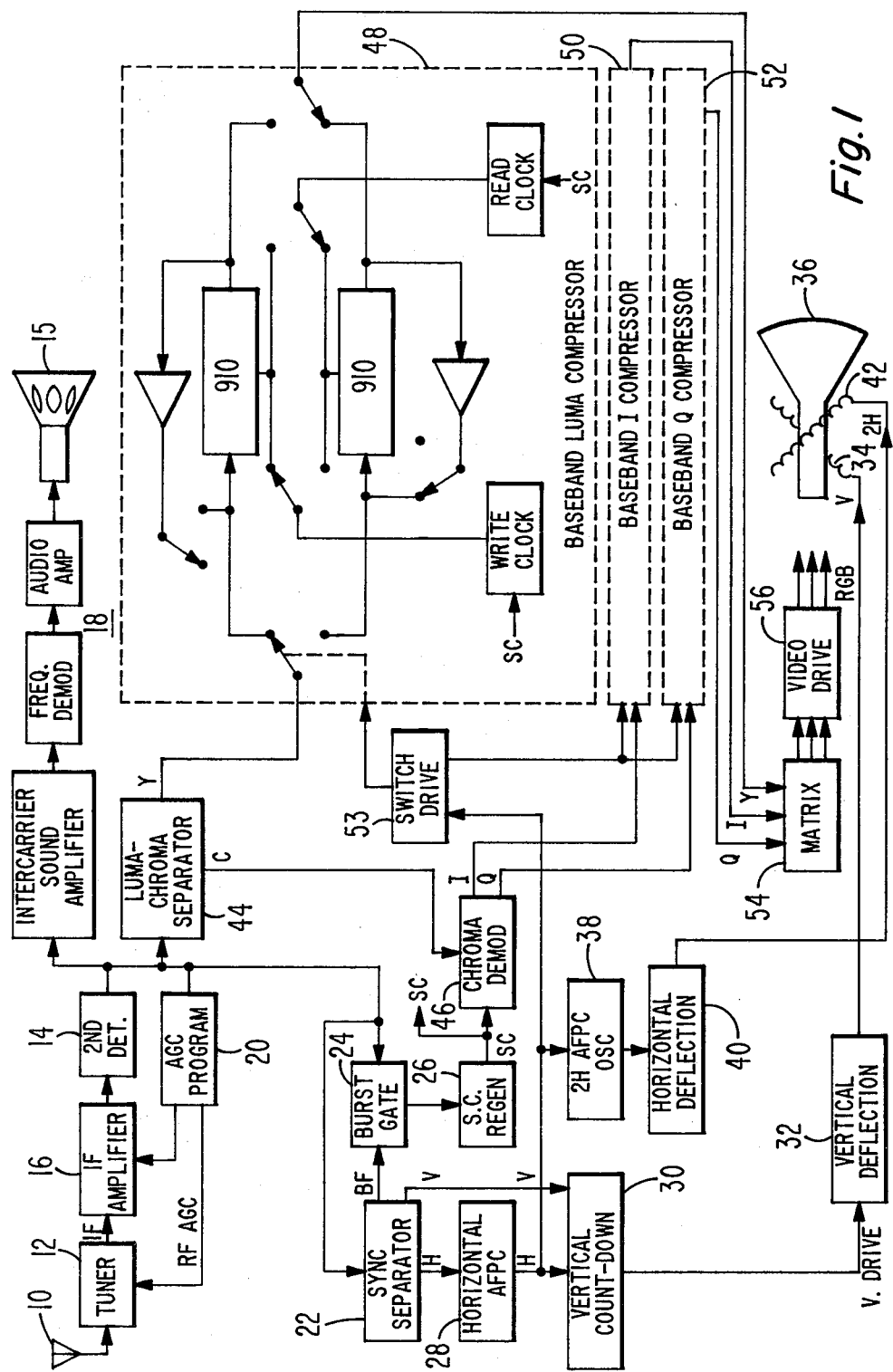
FIG. 1 is a block diagram of a first embodiment of the invention using three time-compressors.

In FIG. 1, an antenna 10 receives broadcast signals which are applied to a tuner 12 in known fashion to generate an IF signal which is applied to a second detector 14 through an IF amplifier 16. Intercarrier sound signal at the output of detector 14 is amplified, demodulated and the resulting audio signal is applied to a loudspeaker 15 of an audio channel designated generally as 18. Automatic gain control is provided by a programmer 20. A sync separator 22 separates horizontal and vertical signals and generates a burst flag for triggering a burst gate 24 for coupling burst signals to a subcarrier (SC) regenerator 26 which regenerates the subcarrier. Separated H sync is applied to an AFPC loop illustrated as 28 to produce horizontal drive signals which are applied together with vertical sync signals to a vertical count-down circuit 30. The resulting vertical drive is applied to a vertical deflection circuit 32 for generating vertical deflection drive signals for application to a vertical deflection winding 34 of a kinescope 36. A locked oscillator 38 generates 2H signals which are applied to a horizontal deflection circuit 40 for application to a horizontal deflection winding 42. Thus, the horizontal deflection rate of kinescope 36 is 2Hg which is 31.5 KHz for U.S. television standards. A luminance-chrominance separating circuit 44 separates luminance (Y) and chrominance (C) signals for the composite video signal at the output of detector 14. The C signals are applied to a chroma demodulator 36 to produce baseband I and Q signals. Baseband Y, I and Q signals are each applied to one of three baseband time-compression or reduplication circuits illustrated as blocks 48, 50 and 52 to produce time-compressed double-line information which is applied over conductors Y, I and Q to the inputs of a matrix 54 to produce R, G and B signals for application to a video drive circuit 56 which drives the appropriate electrodes of kinescope 36. A common switch drive circuit 53 receives horizontal sync signals and operates certain switches within each time compressor in a manner to be described. Those skilled in the art will recognize that the repetition of information on two adjacent horizontal lines is equivalent to having an astigmatic spot for reducing the visibility of the line structure, without affecting horizontal resolution.

Figure 2:
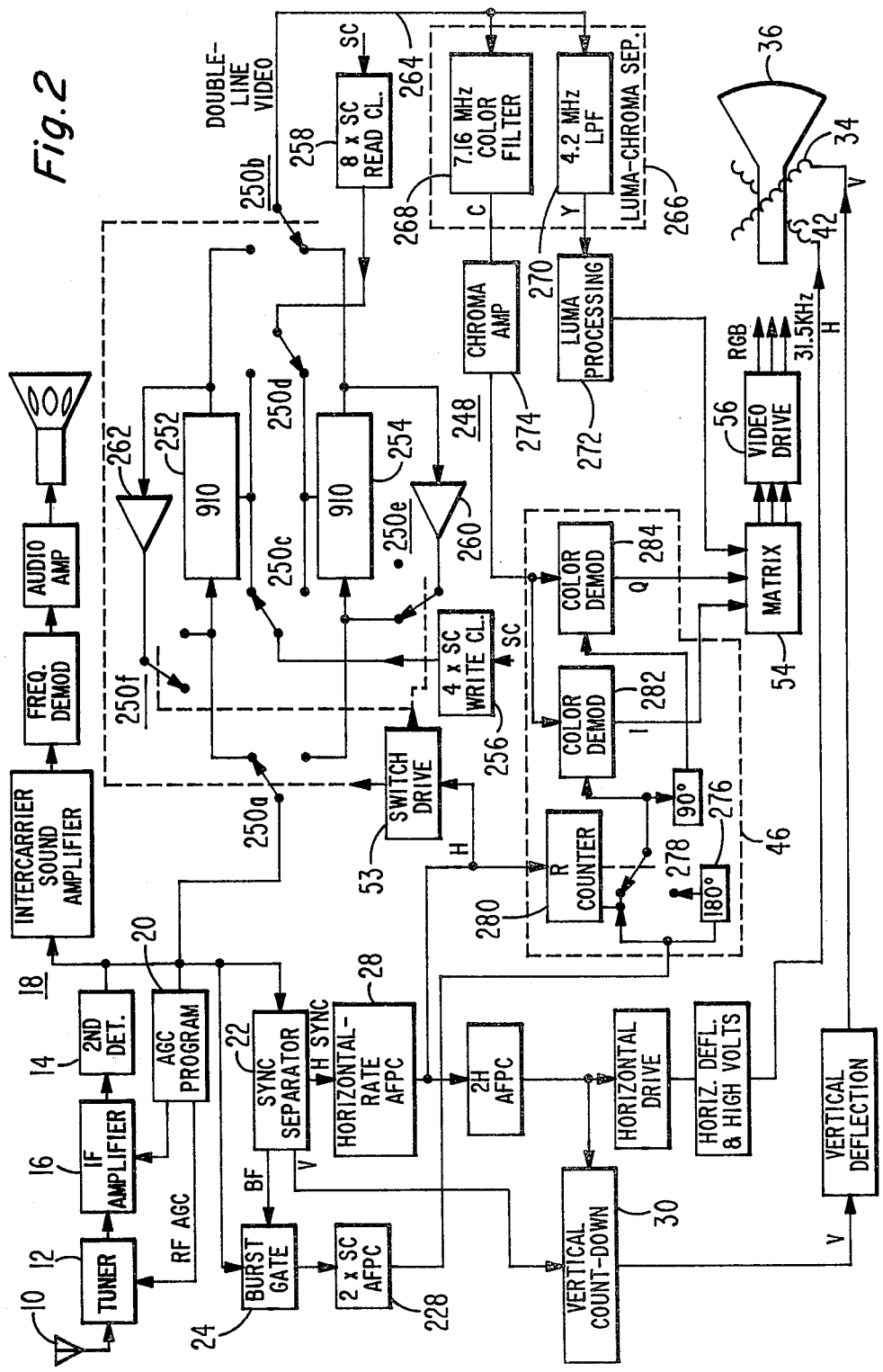
FIG. 2 is a block diagram of a second embodiment of the invention using a single time compressor.

In FIG. 2, elements corresponding to those shown in FIG. 1 are provided with the same reference numerals. The arrangement of FIG. 2 differs from that of FIG. 1 in that a single time compressor 248 is used rather than three time compressors 48, 50 and 52 as in FIG. 1. Time compressor 248 of FIG. 2 time-compresses the composite color signal, including both luminance and modulated chrominance. In FIG. 2, a time compressor designated generally as 248 includes a switch 250a coupled to receive composite color signals from the output of detector 14. Switch 250a is ganged with a switch 250b for simultaneous drive therewith by a switch drive circuit 53 operated at the horizontal rate. In the position shown, switch 250a is arranged to load information into a CCD delay line 252 having 910 elements or cells, while switch 250b is arranged to unload CCD delay line 254, also having 910 cells. A further set of switches 250c and 250d ganged with switches 250a and 250b couple a 4×SC WRITE clock signal from a generator 256 to the clock input terminal of delay line 252 so as to load the information of the currently received horizontal line into the delay line. At 4×SC, the entire horizontal line including active, blanking and sync portions includes exactly 910 pixels, and thus delay 252 becomes full just as the horizontal line being loaded ends. Also in the position of the switches as shown, an 8×SC READ clock generator 258 is coupled to the clock input of CCD delay 254 so as to clock information out of the delay line at double the rate at which it was written in. A buffer amplifier 260 has its input terminal coupled to the output terminal of delay 254 and its output coupled by a switch 250e back to the input of delay line 910. Similarly, a buffer amplifier 262 is coupled to the output of delay 252 and its output is coupled (in the position shown) to an open terminal of portion f of switch 250. Switches 250e and 250f are ganged with the other portions of switch 250.

In operation, delay 252 becomes filled with the current line of information while delay line 254 is being clocked and read out. At the beginning of the next horizontal sync interval, switch 250 is thrown to the alternate position. This decouples the output terminal of buffer amplifier 260 from the input of delay line 254 and couples the output terminal of buffer amplifier 262 to the input of delay line 252. At the same time, switches 250c and d apply write-rate clock signals to delay 254 and read-rate clock signals to delay 252. Also, switches 250a and 250b couple delay 254 for loading and delay 252 for reading out double - line video. During this second line of operation, delay line 254 loads at the 4×SC rate. Delay line 252 unloads at double that rate, and so exhausts its information at the time of the middle of the incoming line. However, because buffer amplifier 262 couples the output of delay line 252 to its input, delay line 252 refills itself during the reading, and so can in principle repeat the same line indefinitely. After the first repetition, i.e. after the same line is twice read from delay line 252, switch 250 is again operated by incoming H sync from its alternate position to the position shown in FIG. 2 to allow delay line 254 to be read twice at the 8×SC rate while delay line 252 loads at the 4×SC rate. This cyclic operation continues, with the result that for each horizontal line applied to the input terminal of time compressor 248, two identical time-compressed lines appear on output conductor 264.

The composite signals on conductor 264 are time-compressed, and therefore are doubled in frequency. Separation of chrominance from luminance is therefore accomplished by a chroma-luma separator 266 including a bandpass filter 268 centered on a frequency of 2×SC, or 7.16 MHz for NTSC standards. A 4.2 MHz low pass filter 270 can be used for separating luminance information. The luminance information is applied to conventional luminance signal processing circuits illustrated as 272 which operates at twice the normal luminance frequency. The chroma signals are applied to a chroma amplifier 274 for amplification and further filtering, and to a color demodulator 46.

The double-line modulated chroma is different from the standard modulated chroma signal, in that the phase of the subcarrier is identical for each replicated line pair. If no steps were to be taken to correct the phase of the subcarrier used for demodulation, each line pair would include one line with correct color and a second line with an approximately complementary color, which would result in an approximately colorless picture. This problem is corrected by a 180° phase-shifter 276 associated with demodulator 46, together with a switch designated as 278 driven by a switch driving counter 280 which counts 227.5 cycles of the 2×SC clock signal from 2×SC AFPC circuit 28, corresponding to one complete horizontal line of the double-line video, and then operates switch 278 to couple phase-shifter 276 into the 2×SC line applied to the demodulators. Counter 280 is reset at the beginning of each standard-rate horizontal line by a sync signal applied to reset (R) input from horizontal-rate AFPC 28. Thus, at the beginning of each standard-rate horizontal line, which is when the first of a pair of replicated horizontal lines of video begins to be read from time-compressor 248, counter 280 is reset to place switch 278 in the position shown to couple 2×SC signals to color demodulators 282 and 284 without passing through 180° phase shifter 276. When 227.5 cycles of 2×SC clock have been counted counter/driver 280 throws switch 278 to couple the 2×SC clock signals through phase-shifter 276 to accomodate the relative phase shift of the second of the pair of horizontal lines emerging from time-compressor 248.

Figure 3D:
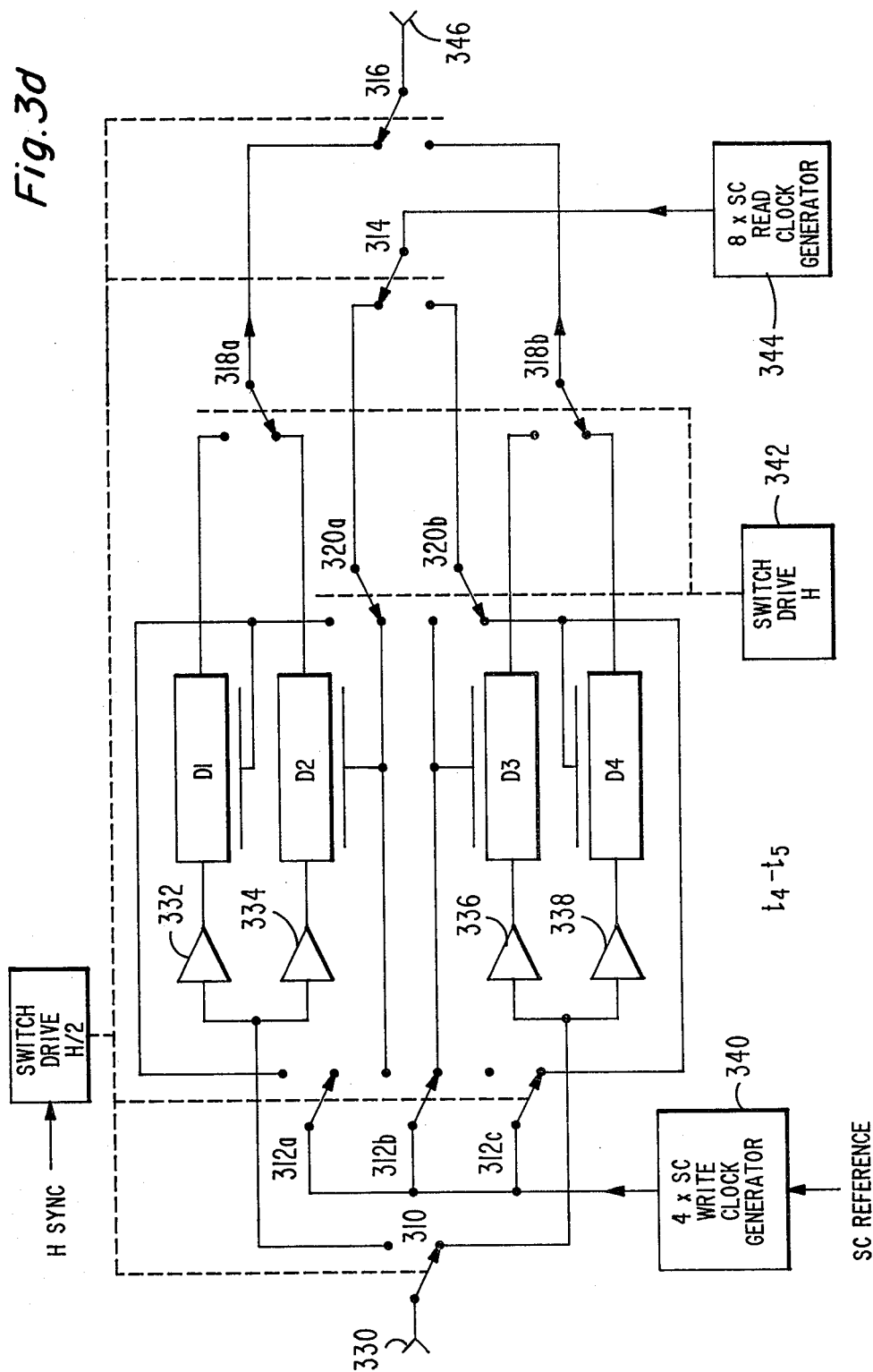
Figure 4:
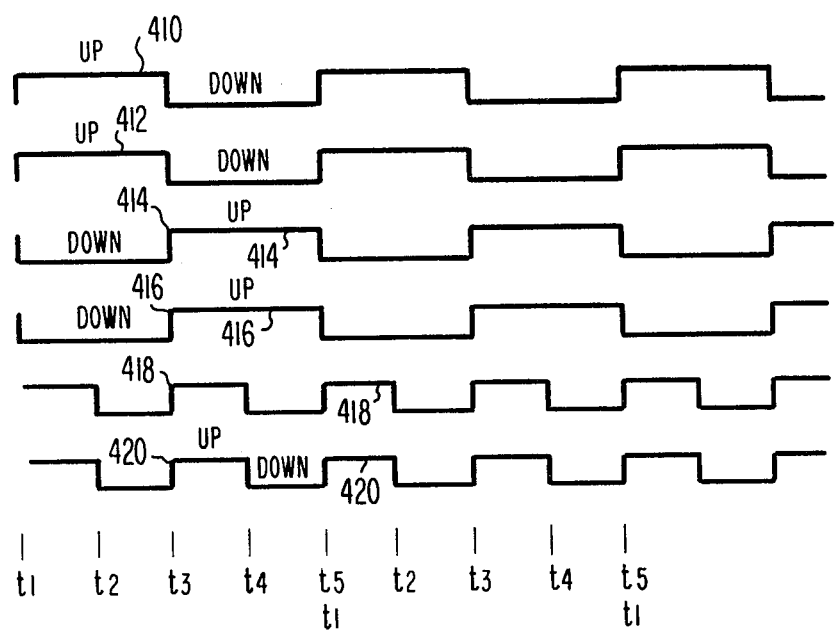
FIG. 4 is a timing diagram as an aid to understanding the operating sequence of the time compressor of FIG. 3.

The arrangement of FIG. 3 illustrates a time-compressor adapted for producing two identical output lines for each input line. In FIG. 3, signals applied at an input terminal 330 are applied to the input terminal of buffer amplifiers 332 and 334, which drive delay lines D1 and D2 for loading. The switch position shown in FIG. 3a correspond to time interval T1-T2 of FIG. 4. In FIG. 4, the lines labelled 410-420 correspond to the physical conditions of switches 310-320, respectively, as represented in FIG. 3. Thus, for the recurrent interval T1-T2, it is possible to establish that switches 310, 312, 318 and 320 must be in a physical UP state (as shown in FIG. 3), while switches 314 and 316 are in a DOWN state. This corresponds with the situation depicted in FIG. 3a. Similarly, the switch condition of FIG. 3b is illustrated by waveforms 410-420 in the interval T2-T3 in FIG. 4. FIGS. 3c and 3d are schematic representations of the switch conditions of the time compressor for inervals T3-T4 and T4-T5, respectively. The cycle repeats again, beginning at time T5, and therefore times T5 and T1 correspond.

In interval T1-T2 illustrated in FIG. 3a, delay lines D1 and D2 are being loaded in parallel with the input signal applied at terminal 330, and is being clocked in at a 4×SC rate by clock signal applied from generator 340 to the clock input of D1 by way of switch 312a and to the clock input of D2 by way of switch 312b. The output signals from D1 and D2 are prevented from reaching output terminal 346 by switches 316 and 318a, respectively. At the same time, 8×SC READ clock signal from generator 344 is applied to the clock input terminal of D3 by way of switches 314 and 320b, but D4 receives no clock pulses and remains dormant. The signal produced at the output terminal of delay line D3 is applied to output terminal 346 by way of switches 318b and 316. Since the contents of D3 are being read at 8×SC, D3 runs out of information at a time T2, midway through the incoming horizontal line. At time T2, the switches assume the state shown in FIG. 3b. Input signals continue to be applied to D1 and D2 in parallel, clocked at the 4×SC rate. Output signal from D1, D2 representing information from the penultimate line does not reach output terminal 346. The 8×SC clock signal is applied to D4, rather than D3, and output signal is coupled from D4 to output terminal 346. This output signal is a duplicate of the signal read from D3 during interval T1-T2. At a time T3, D4 runs out of information, and also the line of video applied to input terminal 330 ends. The switches then assume the state illustrated in FIG. 3c. The input signal is routed by switch 310 to buffer amplifiers 336 and 338 for application in parallel to D3 and D4, which receive 4×SC clock signals from generator 340 by way of switches 312b, c. The output terminals of D3, D4 are decoupled from output terminal 346. Also in interval T3-T4, 8×SC clock is applied to D1, and the output terminal of D1 is coupled to output terminal 346. The line of video information stored in D1 is read to terminal 346. The information runs out at time T4, and the circuit assumes the switch position illustrated in FIG. 3d, for continuing to load D3, D4 in parallel while reading D2. At the time T5 at which the information in D2 runs out, the incoming horizontal line being loaded into D3, D4 also ends. This corresponds to the state at the time T1 of the beginning of the cycle. The cycle repeats continuously, producing two lines of output video for each line of input video. As described in conjunction with FIG. 2, the output video is at twice the frequency and recurs at double rate.

Other embodiments of the invention will be apparent to those skilled in the art. In particular, the described arrangement may be used in conjunction with large-screen or projection-type television displays. The described arrangement may be used in conjunction with a monitor rather than a broadcast signal receiver. Also, the number of repetitions generated by the reduplications may be more than one, so that three or more repetitions of the information of each line-scan occur. The arrangement of the invention may be useful for a receiver adapted for receiving either high-definition television signals encoded according to the system described in the aforementioned Dischert and Oakley application or standard-definition television signals, since the convertible receiver must be adaptable for operation at twice the standard deflection rate but when receiving standard signals may not have sufficient information for every other displayed raster line. Also, digital random-access memories may be used instead of the CCD delay lines as described in the embodiments, as is well known in the art. The sync signal separator and subcarrier regenerators may be coupled to the output terminals of the line-doubling apparatus rather than to the input to generate double line-rate sync signals directly, without the use of a doubling AFPC loop. If desired, the number of repetitions may differ from line to line, as for example displaying a first line twice, the next line thrice, and thereafter following a 2, 3, 2, 3 or other pattern. In the case of CCD delay lines, which are subject to attenuation at higher video frequencies, it may be desirable to include a compensator at the input or output to flatten the overall frequency response. Anti-alias filters may be used as required to prevent unwanted aliasing done to the sampling rate.

What is claimed is:

1. A television raster display apparatus arranged for reducing visibility of the line scans, comprising:
    a source of composite line-scan television signals, said line-scan signals recurring at a first rate and including synchronizing signals and image information;
    doubling means coupled to said source of television signals for generating two substantially identical sequential line-scan signals from each line-scan signal from said source, said doubling means thereby doubling the frequency of said image information and also doubling the recurrence rate to form said two identical line-scan signals at a second recurrence rate; and
    display means coupled to said doubling means for displaying the output signal therefrom at said second recurrence rate thereby displaying each line-scan of signals from said source twice whereby the visibility of said line-scans is reduced.

2. An apparatus according to claim 1 wherein said doubling apparatus comprises:
    controllable memory means having an input terminal coupled to said source of line-scan television signals;
    write control means coupled to a control input terminal of said controllable delay means for loading said controllable memory means at a first rate until said controllable memory means contains the information of one full line-scan;
    read control means coupled to said memory
    means for reading said memory means at a second rate greater than said first rate for producing during a reading interval at an output terminal of said memory means a replcia of the signal applied to said input terminal; and
    switch means coupled to said input and output terminals of said memory means for coupling said signal at said output terminal to said input terminal during said reading interval whereby said memory means replicates said information of one full line-scan.

3. An apparatus according to claim 2 wherein said second rate is twice said first rate.

4. An apparatus according to claim 2 or 3 wherein said memory means comprises a CCD delay line.

5. An apparatus according to claims 2 or 3 wherein said read control means is synchronized by synchronizing signals extracted from said composite television signals by sync signal separating means coupled to said source of composite line-scan television signals.

6. A television raster display apparatus arranged for reducing the visibility of the line-scan pattern, comprising:
    a source of line-scan television signals recurring at a first rate;
    memory means coupled to said source for storing during a recurrent first interval information from each line-scan television signal;
    controllable reading means coupled to said memory means for reading said stored information relating to each line-scan television signal from said memory; and
    control means coupled to said controllable reading means for reading each said stored information from each line scan television signal a predetermined plurality of times during an interval corresponding to said first interval to form reduplicated television signals.

7. An apparatus according to claim 6 further comprising display means coupled to said memory means for displaying said reduplicated signals in raster-scan form.

* * * * *